United States Patent
Yanagidate

(10) Patent No.: US 9,549,113 B2
(45) Date of Patent: Jan. 17, 2017

(54) IMAGING CONTROL TERMINAL, IMAGING SYSTEM, IMAGING METHOD, AND PROGRAM DEVICE

(71) Applicant: Olympus Corporation, Shibuya-ku, Tokyo (JP)

(72) Inventor: Masaharu Yanagidate, Sagamihara (JP)

(73) Assignee: Olympus Corporation, Tokyo (JP)

( * ) Notice: Subject to any disclaimer, the term of this patent is extended or adjusted under 35 U.S.C. 154(b) by 6 days.

(21) Appl. No.: 14/279,930

(22) Filed: May 16, 2014

(65) Prior Publication Data
US 2014/0347507 A1 Nov. 27, 2014

(30) Foreign Application Priority Data
May 22, 2013 (JP) ................................ 2013-108222

(51) Int. Cl.
*H04N 5/232* (2006.01)
(52) U.S. Cl.
CPC ...... *H04N 5/23206* (2013.01); *H04N 5/23216* (2013.01); *H04N 5/23296* (2013.01); *Y02B 60/50* (2013.01)
(58) Field of Classification Search
CPC ............ H04N 5/23206; H04N 5/23216; H04N 5/23296; H04N 5/23203; Y02B 60/50
USPC ................ 725/105; 348/211.2, 211.3, 221.1, 348/211.99, 362, 14.05, 114, 161, 211.1, 211.4, 348/211.8, 211.14, 222.1, 734, 143; 382/181, 382/190, 118, 103, 209
See application file for complete search history.

(56) References Cited

U.S. PATENT DOCUMENTS

| 2002/0113861 A1* | 8/2002 | Lim ....................... H04N 7/185 348/14.02 |
| 2004/0176118 A1* | 9/2004 | Strittmatter ............. H04L 67/16 455/500 |
| 2005/0012824 A1* | 1/2005 | Stavely .............. H04N 5/23216 348/211.99 |

(Continued)

FOREIGN PATENT DOCUMENTS

| JP | A-2003-298917 | 10/2003 |
| JP | A-2005-215373 | 8/2005 |

(Continued)

OTHER PUBLICATIONS

Office Action to corresponding Japanese Patent Application No. 2013-108222, mailed on Nov. 15, 2016 (5pgs.), with translation (5pgs.).

*Primary Examiner* — Tuan Ho
*Assistant Examiner* — Marly Camargo
(74) *Attorney, Agent, or Firm* — John C. Pokotylo; Straub & Pokotylo

(57) ABSTRACT

An imaging control terminal includes a wireless communication interface configured to wirelessly communicate with an imaging terminal, an imaging module configured to generate imaging data, a display interface configured to display an image corresponding to the imaging data generated by the imaging module, an operation interface configured to receive an operation of an operator designating an imaging area or an imaging target to be imaged by the imaging terminal for the image, an information generation unit configured to generate imaging area information representing the imaging area or imaging target information representing the imaging target, and a communication control unit configured to cause the wireless communication interface to wirelessly transmit the imaging area information or the imaging target information to the imaging terminal.

9 Claims, 16 Drawing Sheets

(56) References Cited

U.S. PATENT DOCUMENTS

| | | | |
|---|---|---|---|
| 2006/0038833 A1* | 2/2006 | Mallinson | A63F 13/02 345/633 |
| 2006/0125928 A1* | 6/2006 | Wolcott | H04N 1/00307 348/211.2 |
| 2008/0070623 A1* | 3/2008 | Ogawa | H04N 5/232 455/556.1 |
| 2009/0141138 A1* | 6/2009 | DeAngelis | G06F 17/30265 348/220.1 |
| 2010/0079607 A1* | 4/2010 | Won | G08C 17/02 348/211.2 |
| 2013/0120591 A1* | 5/2013 | Bednarczyk | H04W 48/18 348/207.1 |
| 2013/0342699 A1* | 12/2013 | Hansen | G07C 1/24 348/157 |
| 2014/0337434 A1* | 11/2014 | Hansen | G06Q 50/10 709/204 |

FOREIGN PATENT DOCUMENTS

| | | |
|---|---|---|
| JP | A-2007-081537 | 3/2007 |
| JP | A-2009-044472 | 2/2009 |
| JP | A-2010-204180 | 9/2010 |
| JP | A-2011-091607 | 5/2011 |
| JP | A-2011-188210 | 9/2011 |
| JP | 2012-186698 | 9/2012 |
| WO | WO 2008-0111168 A1 | 9/2008 |

* cited by examiner

IMAGING CONTROL TERMINAL, IMAGING SYSTEM, IMAGING METHOD, AND PROGRAM DEVICE

BACKGROUND OF THE INVENTION

Field of the Invention

The present invention relates to technology for remotely controlling an imaging terminal.

Priority is claimed on Japanese Patent Application No. 2013-108222, filed May 22, 2013, the content of which is incorporated herein by reference.

Description of the Related Art

There is an imaging system which includes an imaging terminal (digital camera or the like) having a wireless connection function and an imaging control terminal (portable terminal or the like) and in which the imaging control terminal wirelessly remotely operates the imaging terminal to control an imaging operation of the imaging terminal. For example, an example of a portable terminal which wirelessly remotely operates a digital camera is disclosed in Japanese Unexamined Patent Application, First Publication No. 2012-186698. Specifically, imaging data is transmitted from the digital camera to the portable terminal after the portable terminal has been wirelessly connected to the digital camera and an image captured by the digital camera is displayed on a display unit of the portable terminal receiving the imaging data. In addition, if a user performs a zoom operation on a display screen of the portable terminal when the image captured by the digital camera is displayed on the display unit of the portable terminal, the zoom setting of the digital camera is changed.

SUMMARY

According to an aspect of the present invention, an imaging control terminal includes: a wireless communication interface configured to wirelessly communicate with an imaging terminal; an imaging module configured to generate imaging data; a display interface configured to display an image corresponding to the imaging data generated by the imaging module; an operation interface configured to receive an operation of an operator designating an imaging area or an imaging target to be imaged by the imaging terminal for the image; an information generation unit configured to generate imaging area information representing the imaging area or imaging target information representing the imaging target; and a communication control unit configured to cause the wireless communication interface to wirelessly transmit the imaging area information or the imaging target information to the imaging terminal.

In addition, according to an aspect of the present invention, an imaging terminal includes: a wireless communication interface configured to wirelessly communicate with an imaging control terminal; an imaging module configured to generate imaging data; a communication control unit configured to cause the wireless communication interface to wirelessly receive imaging area information representing an imaging area or imaging target information representing an imaging target wirelessly transmitted from the imaging control terminal; an imaging control unit configured to cause the imaging module to generate the imaging data after the imaging area information or the imaging target information has been wirelessly received; and an image processing unit configured to extract data corresponding to an image including the imaging area or the imaging target from the imaging data generated by the imaging module.

In addition, according to an aspect of the present invention, an imaging system includes: an imaging control terminal and an imaging terminal, wherein the imaging control terminal includes: a first wireless communication interface configured to wirelessly communicate with the imaging terminal, a first imaging module configured to generate imaging data; a display interface configured to display an image corresponding to the imaging data generated by the first imaging module; an operation interface configured to receive an operation of an operator designating an imaging area or an imaging target to be imaged by the imaging terminal for the image; an information generation unit configured to generate imaging area information representing the imaging area or imaging target information representing the imaging target; and a first communication control unit configured to cause the first wireless communication interface to wirelessly transmit the imaging area information or the imaging target information to the imaging terminal, and wherein the imaging terminal includes: a second wireless communication interface configured to wirelessly communicate with the imaging control terminal; a second imaging module configured to generate imaging data; a second communication control unit configured to cause the second wireless communication interface to wirelessly receive the imaging area information or the imaging target information wirelessly transmitted from the imaging control terminal; an imaging control unit configured to cause the second imaging module to generate imaging data after the imaging area information or the imaging target information has been wirelessly received; and an image processing unit configured to extract data corresponding to an image including the imaging area or the imaging target from the imaging data generated by the second imaging module.

In addition, according to an aspect of the present invention, an imaging method includes the steps of: displaying, by a display interface of an imaging control terminal, an image corresponding to imaging data generated by a first imaging module of the imaging control terminal; generating, by an information generation unit of the imaging control terminal, imaging area information representing an imaging area or imaging target information representing an imaging target when an operation interface of the imaging control terminal has received an operation of an operator designating the imaging area or the imaging target to be imaged by an imaging terminal for the image; wirelessly transmitting, by a first wireless communication interface of the imaging control terminal, the imaging area information or the imaging target information to the imaging terminal; wirelessly receiving, by a second wireless communication interface of the imaging terminal, the imaging area information or the imaging target information wirelessly transmitted from the imaging control terminal; generating, by a second imaging module of the imaging terminal, imaging data after the imaging area information or the imaging target information has been wirelessly received; and extracting, by an image processing unit of the imaging terminal, data corresponding to an image including the imaging area or the imaging target from the imaging data generated by the second imaging module.

In addition, according to an aspect of the present invention, a program device saves a program for causing a computer to execute the steps of causing a display interface to display an image corresponding to imaging data generated by an imaging module; generating imaging area information representing an imaging area or imaging target information representing an imaging target when an operation interface has received an operation of an operator designating the imaging area or the imaging target to be imaged by an imaging terminal for the image; and causing a wireless communication interface to wirelessly transmit the imaging area information or the imaging target information to the imaging terminal.

In addition, according to an aspect of the present invention, a program device saves a program for causing a computer to execute the steps of causing a wireless communication interface to wirelessly receive imaging area information representing an imaging area or imaging target information representing an imaging target wirelessly transmitted from an imaging control terminal; causing an imaging module to generate imaging data after the imaging area information or the imaging target information has been wirelessly received, and causing an image processing unit to extract data corresponding to an image including the imaging area or the imaging target from the imaging data generated by the imaging module.

DETAILED DESCRIPTION OF THE PREFERRED EMBODIMENTS

Hereinafter, embodiments of the present invention will be described with reference to the drawings.

(First Embodiment)

First, the first embodiment of the present invention will be described. In this embodiment, an example in which the present invention is applied to an imaging system including a digital camera (imaging terminal) configured to wirelessly transmit imaging data after imaging to a portable terminal and a portable terminal (imaging control terminal) configured to receive the imaging data transmitted from the digital camera and control an imaging operation of the digital camera will be described.

(Configuration)

Figure 1A:
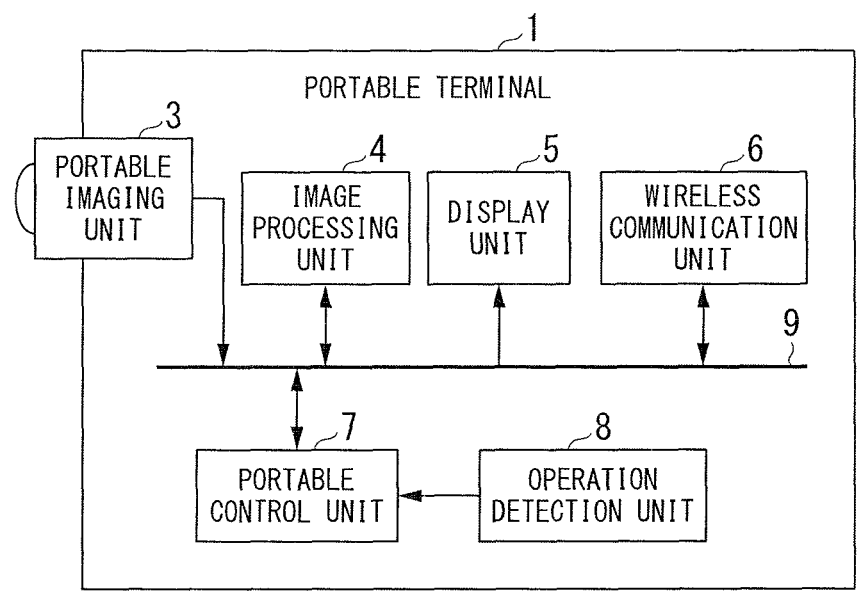
FIGS. 1A and 1B are block diagrams illustrating a configuration of a portable terminal according to a first embodiment of the present invention.
Figure 1B:
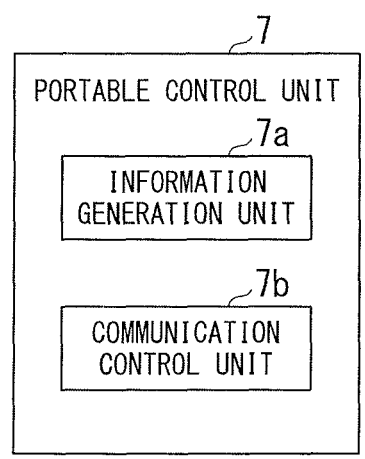
Figure 2A:
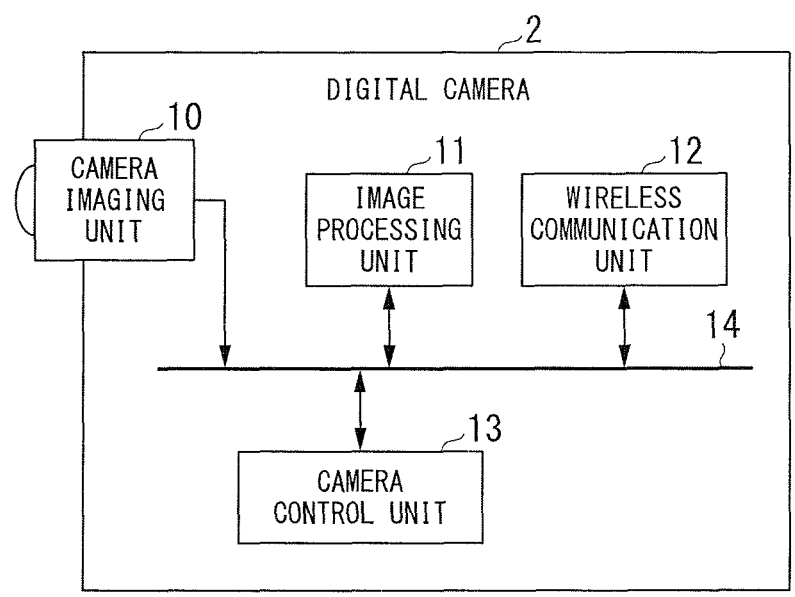
FIGS. 2A and 2B are block diagrams illustrating a configuration of a digital camera according to the first embodiment of the present invention.
Figure 2B:
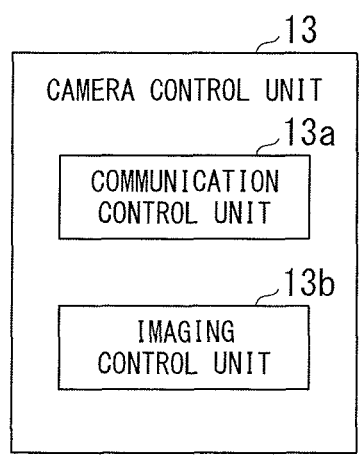

FIGS. 1A and 1B are block diagrams illustrating a configuration of a portable terminal 1 according to this embodiment FIGS. 2A and 2B are block diagrams illustrating a configuration of a digital camera 2 according to this embodiment. First, the configurations of the portable terminal 1 and the digital camera 2 and an outline of an operation of the imaging system will be described using FIGS. 1A and 1B and FIGS. 2A and 2B The imaging system of this embodiment includes the portable terminal 1 and the digital camera 2, and the portable terminal 1 and the digital camera 2 are connected by wireless communication. The digital camera 2 wirelessly transmits captured image (still image) data generated by imaging to the portable terminal 1 and the portable terminal 1 wirelessly controls the imaging operation of the digital camera 2.

As illustrated in FIG. 1A, the portable terminal 1 includes a portable imaging unit 3, an image processing unit 4, a display unit 5, a wireless communication unit 6, a portable control unit 7, an operation detection unit 8, and a data bus 9. The portable imaging unit 3 is an imaging module (imaging device) which performs an imaging operation to generate imaging data. The image processing unit 4 is a circuit which performs image processing on the imaging data from the portable imaging unit 3. The display unit 5 is a display interface (display device) which displays an image corresponding to the imaging data generated by the portable imaging unit 3 and an operation item. The wireless communication unit 6 is a wireless communication interface (wireless communication device) which wirelessly communicates with the digital camera 2. The portable control unit 7 controls the overall portable terminal 1. The operation detection unit 8 is an operation interface (operation device) which receives an operation performed by an operator and detects an instruction based on the operation. In the operation performed by the operator, an operation of designating an imaging area or an imaging target to be imaged by the digital camera 2 for an image to be displayed by the display unit 5 is included. The data bus 9 is a transmission path of various types of data such as imaging data.

In this embodiment, an example in which a flat panel display is used as the display unit 5 and a touch panel disposed on the flat panel display is used as the operation detection unit 8 will be described.

FIG. 1B illustrates a functional configuration of the portable control unit 7. The portable control unit 7 implements at least functions of an information generation unit 7a and a communication control unit 7b. The information generation unit 7a generates imaging area information representing the imaging area based on an instruction detected by the operation detection unit 8 or imaging target information representing the imaging target based on the instruction detected by the operation detection unit 8. The communication control unit 7b causes the wireless communication unit 6 to wirelessly transmit the imaging area information or the imaging target information to the digital camera 2. In addition, the communication control unit 7b causes the wireless communication unit 6 to wirelessly transmit imaging execution instruction information for issuing an instruction to execute imaging to the digital camera 2 and wirelessly receive imaging data wirelessly transmitted from the digital camera 2.

The portable control unit 7 stores a program for controlling the operation of the portable control unit 7 or necessary data. For example, the portable control unit 7, which is a computer of the portable terminal 1, reads and executes the program for controlling the operation of the portable control unit 7 and therefore the functions of the information generation unit 7a and the communication control unit 7b are implemented as software functions. In addition, this program, for example, may be provided by a "computer-readable recording medium" such as a flash memory. In addition, the above-described program may be input to the portable terminal 1 by transmitting the program from a computer storing the program in a storage device or the like to the portable terminal 1 via a transmission medium or transmission waves of the transmission medium. Here, the "transmission medium" for transmitting the program refers to a medium having a function of transmitting information like a network (communication network) such as the Internet or a communication circuit (communication line) such as a telephone circuit. In addition, the above-described program may be used to implement some of the above-described functions. Further, the program may be a so-called differential file (differential program) capable of implementing the above-described functions in combination with a program already recorded on the computer.

A terminal including the portable imaging unit 3, the display unit 5, the wireless communication unit 6, the operation detection unit 8, and the portable control unit 7 as a minimum configuration corresponds to one aspect of the imaging control terminal of the present invention. For example, the portable imaging unit 3 corresponds to an imaging module in the imaging control terminal of the present invention, the display unit 5 corresponds to a display interface in the imaging control terminal of the present invention, the wireless communication unit 6 corresponds to a wireless communication interface in the imaging control terminal of the present invention, the operation detection unit 8 corresponds to an operation interface in the imaging control terminal of the present invention, and the portable control unit 7 corresponds to an information generation unit and a communication control unit in the imaging control terminal of the present invention.

As illustrated in FIG. 2A, the digital camera 2 includes a camera imaging unit 10, an image processing unit 11, a wireless communication unit 12, a camera control unit 13, and a data bus 14. The camera imaging unit 10 is an imaging module (imaging device) which performs an imaging operation to generate imaging data. The image processing unit 11 is a circuit which performs image processing on the imaging data from the camera imaging unit 10, and extracts data corresponding to an image including an imaging area or an imaging target from the imaging data generated by the camera imaging unit 10. The wireless communication unit 12 is a wireless communication interface (wireless communication device) which wirelessly communicates with the portable terminal 1. The camera control unit 13 controls the overall digital camera 2. The data bus 14 is a transmission path of various types of data such as imaging data.

FIG. 2B illustrates a functional configuration of the camera control unit 13. The camera control unit 13 implements at least functions of a communication control unit 13a and an imaging control unit 13b. The communication control unit 13a causes the wireless communication unit 12 to wirelessly receive the imaging area information or the imaging target information wirelessly transmitted from the portable terminal 1. In addition, the communication control unit 13a causes the wireless communication unit 12 to wirelessly receive the imaging execution instruction information wirelessly transmitted from the portable terminal 1 and wirelessly transmit the imaging data generated by the camera imaging unit 10 to the portable terminal 1. The imaging control unit 13b causes the camera imaging unit 10 to execute imaging and generate imaging data after the imaging area information or the imaging target information has been wirelessly received.

The camera control unit 13 stores a program for controlling the operation of the camera control unit 13 or necessary data. For example, the camera control unit 13, which is a computer of the digital camera 2, reads and executes the program for controlling the operation of the camera control unit 13 and therefore the functions of the communication control unit 13a and the imaging control unit 13b are implemented as software functions. An implementation form of this program is similar to an implementation form of a program which implements the functions of the information generation unit 7a and the communication control unit 7b of the portable terminal 1. The camera control unit 13 may have a function of the image processing unit 11

A terminal including the camera imaging unit 10, the image processing unit 11, the wireless communication unit 12, and the camera control unit 13 as a minimum configuration corresponds to one aspect of the portable terminal of the present invention. For example, the camera imaging unit 10 corresponds to the imaging module in the imaging terminal of the present invention, the image processing unit 11 corresponds to the image processing unit in the imaging terminal of the present invention, the wireless communication unit 12 corresponds to the wireless communication interface in the imaging terminal of the present invention, and the camera control unit 13 corresponds to the communication control unit and the imaging control unit in the imaging terminal of the present invention.

(Operation Outline)

The portable terminal 1 displays an image corresponding to imaging data from the portable imaging unit 3 on the display unit 5. Thereafter, the portable terminal 1 detects an instruction of the operator for the displayed image using the operation detection unit 8 and generates imaging area information or imaging target information according to content of the detected instruction. The portable terminal 1 wirelessly transmits the generated imaging area information or imaging target information to the digital camera 2 via the wireless communication unit 6.

After the transmission of the imaging area information or imaging target information, the portable terminal 1 transmits imaging execution instruction information to the digital camera 2 according to an imaging start instruction of the operator. The imaging area information or imaging target information is generated by combining composition data (data representing composition of a captured image) obtained by processing imaging data from the portable imaging unit 3 in the image processing unit 4 and content indicated by the operator.

The digital camera 2 receives the imaging area information or imaging target information from the portable terminal 1 via the wireless communication unit 12, and determines an imaging range of the imaging data to be transmitted to the portable terminal 1 using the imaging area information or imaging target information and the composition data obtained by processing the imaging data from the camera imaging unit 10 in the image processing unit 11. Upon receiving the imaging execution instruction information from the portable terminal 1, the digital camera 2 transmits the imaging data corresponding to an image of a range designated in the imaging range to the portable terminal 1 via the wireless communication unit 12 after an imaging process has been performed.

(Operation Details)

Figure 3:
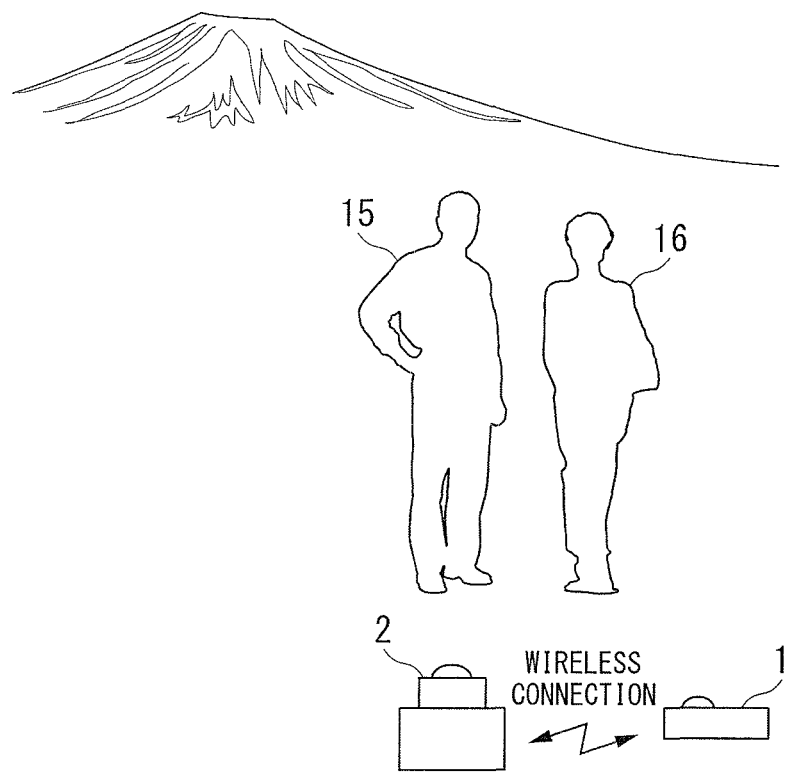
FIG. 3 is a reference diagram illustrating an operation situation of an imaging system according to the first embodiment of the present invention.
Figure 4:
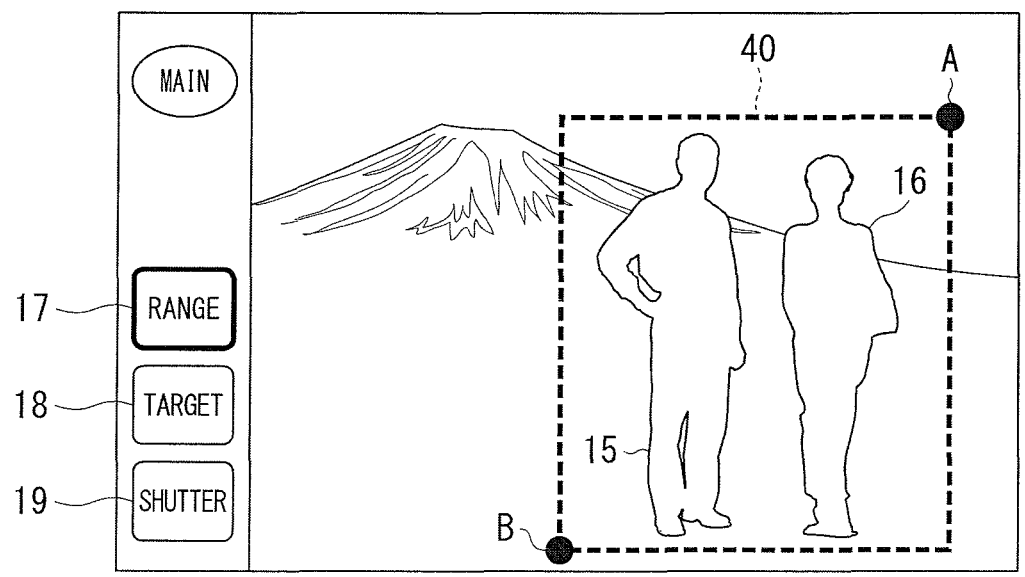
FIG. 4 is a reference diagram illustrating an image displayed by the portable terminal according to the first embodiment of the present invention.

The generation of the imaging area information or imaging target information by the portable terminal 1 and the imaging process by the digital camera 2 using the imaging area information or imaging target information will be described in detail. FIG. 3 illustrates an operation situation of the imaging system according to this embodiment. In FIG. 3, in a state in which the portable terminal 1 and the digital camera 2 are wirelessly connected, the two devices perform imaging toward a person 15 and a person 16. FIG. 4 is an example of an image displayed by the portable terminal 1 on the display unit 5 in the state illustrated in FIG. 3.

The imaging data from the portable imaging unit 3 is given to the display unit 5 via the data bus 9, and the image illustrated in FIG. 4 is displayed. Buttons (a range button 17, a target button 18, and a shutter button 19) are displayed on a left end of the image. Theses buttons are buttons corresponding to operation items to be selected by the operator. When the operator touches and selects the button, the selected button is displayed with emphasis.

Hereinafter, an image displayed on the portable terminal 1 and an image transmitted by the digital camera 2 to the portable terminal 1 will be described for each of the case in which the imaging range (imaging area) is designated and the case in which the imaging target is designated. FIG. 4 illustrates an example of the image displayed on the display unit 5 of the portable terminal 1 when the imaging range is designated. In FIG. 4, the range button 17 is selected and the designation (range designation) of the imaging range is performed. The portable imaging unit 3, the display unit 5, the portable control unit 7, and the operation detection unit 8 cooperatively perform an operation related to the designation of the imaging range.

Specifically, the imaging data from the portable imaging unit 3 is transmitted to the display unit 5 and the display unit 5 displays an image. In parallel with the display of the image, the portable control unit 7 analyzes operation content of the operator detected by the operation detection unit 8 and the portable control unit 7 issues an instruction for causing the display unit 5 to display a button according to the operation content. As a result, the image and the button are displayed on the display unit 5

When the operator has selected the range button 17, the range button 17 is displayed with emphasis as illustrated in FIG. 4. Thereafter, the portable control unit 7 detects a position of the imaging range 40 designated by the operator via the operation detection unit 8. The designation of the imaging range is performed by selecting two points of a display screen to designate a region. In the case of FIG. 4, the imaging range is designated by designating two points A and B.

In the case of FIG. 4, an imaging range 40 is designated to include the persons 15 and 16.

When the designation of the imaging range 40 ends, imaging area information is generated. The imaging area information is information to be used in a process in which the digital camera 2 determines a range of an image to be transmitted to the portable terminal 1. It is only necessary for the imaging area information to be information for enabling the imaging range indicated by the portable terminal 1 to be detected from the imaging data output by the camera imaging unit 10.

When an imaging range 40 has been designated, the imaging area information including composition data representing composition of an image captured by the portable terminal 1 and position data representing a position of the imaging range 40 designated by the operator is generated so that the digital camera 2 can recognize the imaging range 40.

Figure 5:
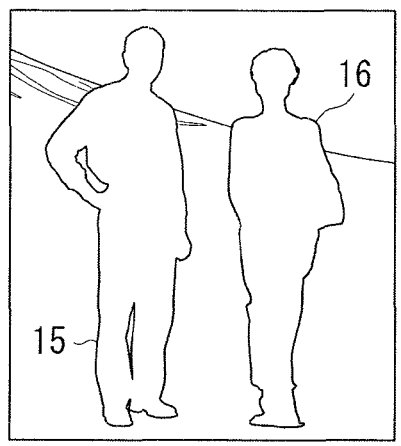
FIG. 5 is a reference diagram illustrating an image transmitted by the digital camera according to the first embodiment of the present invention.

FIG. 5 illustrates an image to be transmitted by the digital camera 2 to the portable terminal 1 when the imaging range 40 has been designated. As illustrated in FIG. 5, the image to be transmitted by the digital camera 2 to the portable terminal 1 is an image corresponding to the imaging range 40 including the persons 15 and 16. When the shutter button 19 is selected in the portable terminal 1, imaging execution instruction information is transmitted from the portable terminal 1 to the digital camera 2. When the digital camera 2 receives the imaging execution instruction information, the image of the range designated in the imaging range 40 is transmitted after an imaging process is performed.

Figure 6:
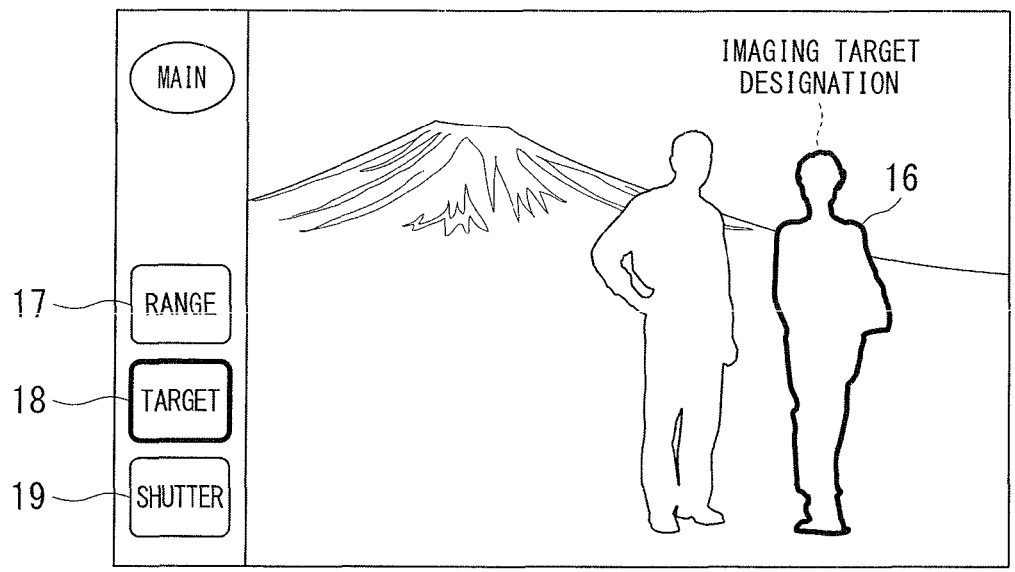
FIG. 6 is a reference diagram illustrating an image displayed by the portable terminal according to the first embodiment of the present invention.

FIG. 6 illustrates an example of an image displayed on the display unit 5 of the portable terminal 1 when the imaging target is designated. In this embodiment, an example in which the person 16 has been selected after the target button 18 has been selected will be described.

When the designation of the person 16 ends, imaging target information is generated. Like the imaging area information, the imaging target information is information to be used in a process in which the digital camera 2 determines a range of an image to be transmitted to the portable terminal 1. It is only necessary for the imaging target information to be information for enabling an imaging target indicated by the portable terminal 1 to be detected from imaging data output by the camera imaging unit 10.

When the person 16 has been designated, imaging target information including composition data representing composition of an image captured by the portable terminal 1 and target data representing the person 16 in the composition data is generated so that the digital camera 2 can recognize the person 16.

Figure 7:
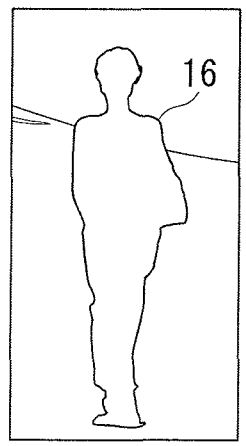
FIG. 7 is a reference diagram illustrating an image transmitted by the digital camera according to the first embodiment of the present invention.

When the person 16 is designated as the imaging target in the image displayed by the portable terminal 1, the person 16 is displayed with emphasis as illustrated in FIG. 6. FIG. 7 illustrates an image to be transmitted by the digital camera 2 to the portable terminal 1 when the person 16 has been selected. As illustrated in FIG. 7, an image obtained by extracting only the person 16 is transmitted from the digital camera 2.

Next, a generation method and a usage method of the imaging area information and the imaging target information will be described. When the digital camera 2 receives the imaging area information or the imaging target information, the image processing unit 11 compares composition data included in the imaging area information or the imaging target information to composition data generated from the imaging data from the camera imaging unit 10. From a comparison result, the image processing unit 11 obtains a correspondence relationship between each position in an image used by the portable terminal 1 for generation of the imaging area information or the imaging target information and each position in an image captured by the digital camera 2. Thereby, it can be seen which part of a range in which the camera imaging unit 10 of the digital camera 2 performs imaging corresponds to a range in which the portable imaging unit 3 of the portable terminal 1 performs imaging.

Thereafter, the image processing unit 11 specifies (determines) a range of an image to be transmitted to the portable terminal 1 using position data included in the imaging area information or target data included in the imaging target information. Thereafter, the image processing unit 11 extracts data of a part corresponding to a specified range from the imaging data generated by the camera imaging unit 10, and generates transmission data to be transmitted to the portable terminal 1. Hereinafter, details of a process of specifying the range of the image to be transmitted to the portable terminal 1 will be described.

It is only necessary for the above-described composition data to be information for enabling a process in which the digital camera 2 recognizes composition of an image during imaging and specifying a part of the recognized composition to be set in a region of an image to be transmitted to the portable terminal 1. Content of the composition data is considered diversely according to an algorithm for recognizing the composition.

As the algorithm for recognizing the composition, various conventional algorithms have been devised. For example, a method of recognizing composition of image data using a luminance distribution of the image data and a method of recognizing composition by extracting a contour line of an image and detecting a pattern of the contour line have been devised. The present invention is not limited by the algorithm for recognizing the composition. In this embodiment, an algorithm of extracting a contour line of an image and recognizing composition using a pattern of the extracted contour line will be described as an example.

As described above, the composition data is generated by the image processing unit 4 processing imaging data from the portable imaging unit 3 in the portable terminal 1. The contour line used in recognition of the composition, for example, is obtained by performing differential processing on imaging data. The composition data includes contour line information obtained as binary data. A range of the composition data to be used in this embodiment, for example, is an overall range of an image captured by the portable terminal 1. In addition, target data to be used when the imaging target has been selected is template data obtained by extracting only the contour line of the imaging target.

The image processing unit 11 extracts the contour line by processing the imaging data from the camera imaging unit 10 and performs a matching (pattern matching) process on the extracted contour line and a contour line represented by composition data of the imaging area information or the imaging target information wirelessly received from the portable terminal 1. According to this matching process, an imaging range corresponding to an overall imaging range of the portable imaging unit 3 is detected in imaging data from the camera imaging unit 10. Various processes have been devised as the matching process and their details will not be described here.

Contour line information constituting composition data among the imaging area information and the imaging target information in this embodiment includes information of an overall imaging range of the portable imaging unit 3. Thus, it is possible to specify the imaging range corresponding to the overall imaging range of the portable imaging unit 3 in the imaging data from the camera imaging unit 10 by performing the matching process using this contour line information and the contour line information obtained by processing the imaging data from the camera imaging unit 10.

When position data of the imaging area information is used as described using FIG. 4, the image processing unit 11 converts the imaging range represented by the position data (the imaging range designated by the operator) into a range of the imaging data from the camera imaging unit 10 using the information of the imaging range specified by the above-described method. The image processing unit 11 determines this range as a range of an image to be transmitted to the portable terminal 1.

In addition, when target data of the imaging target information is used as described using FIG. 6, the image processing unit 11 performs the matching process on the contour line information within the imaging range specified by the above-described method and the template data which is the target data. Thereby, it is possible to specify the position of the imaging target represented by the target data in the imaging data from the camera imaging unit 10. After the position of the imaging target has been specified, the image processing unit 11 determines a predetermined range including the position of the imaging target as the range of the image to be transmitted to the portable terminal 1. The predetermined range is a range in which the imaging target (the person 16 in the example of FIG. 7) is designated as the center, and, for example, is a range including the range of the target data and 16 pixels around the target data.

Figure 8:
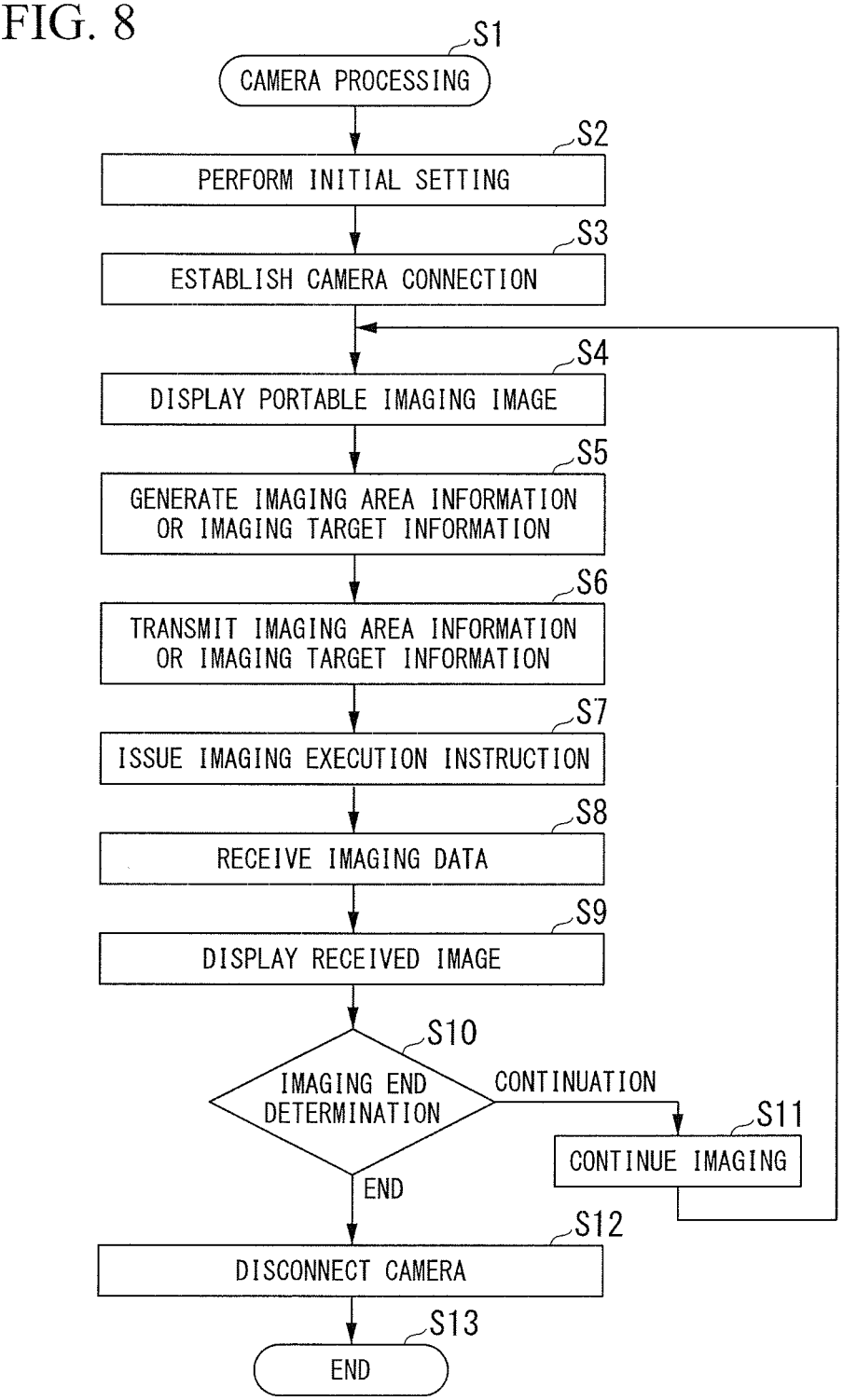
FIG. 8 is a flowchart illustrating a procedure of an operation of the portable terminal according to the first embodiment of the present invention.
Figure 9:
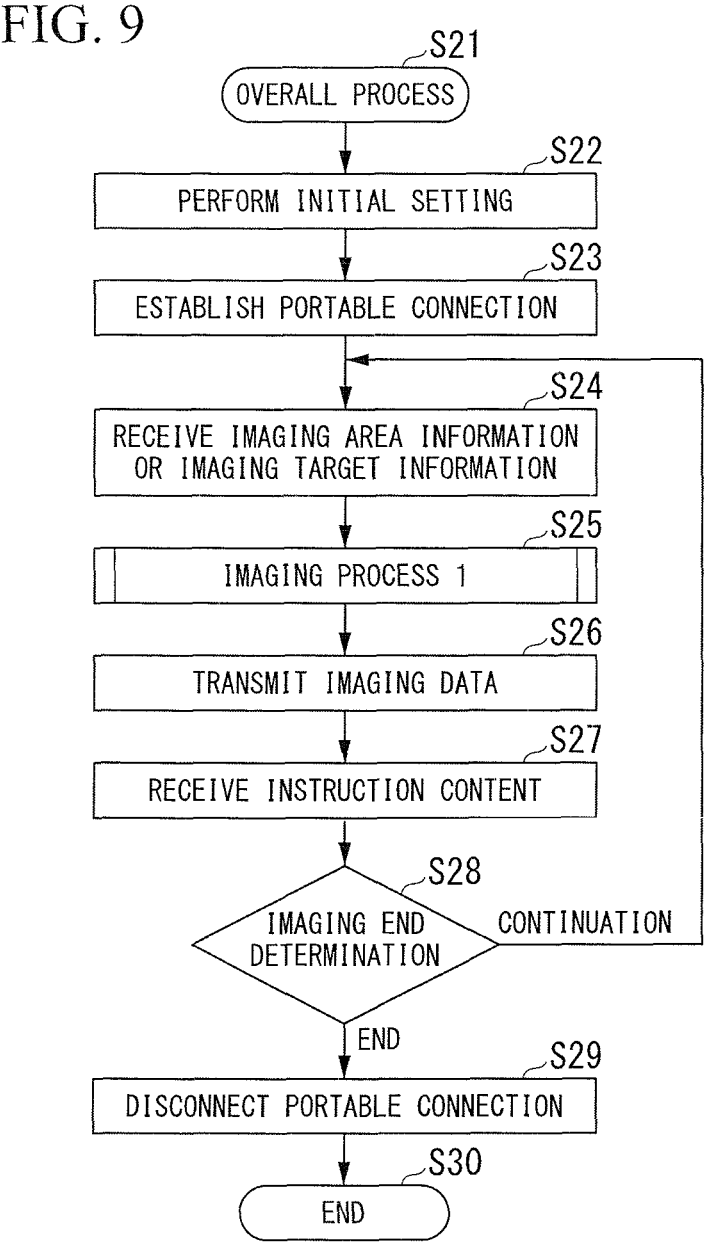
FIG. 9 is a flowchart illustrating a procedure of an operation of the digital camera according to the first embodiment of the present invention.
Figure 10:
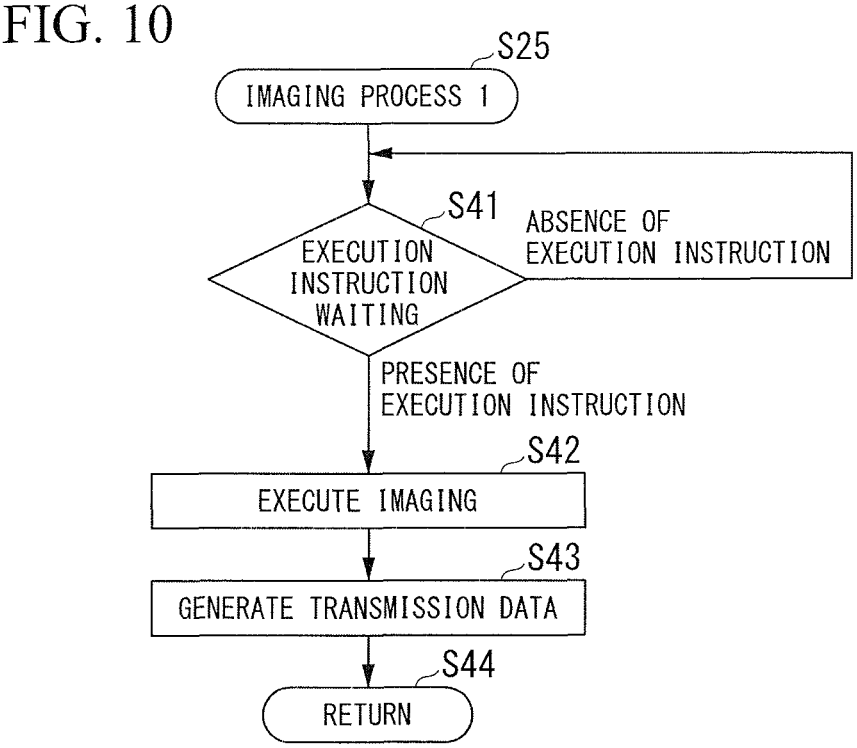
FIG. 10 is a flowchart illustrating a procedure of an operation of the digital camera according to the first embodiment of the present invention.

Next, operations of the respective devices in this embodiment will be described using FIGS. 8 to 10. FIG. 8 illustrates the operation of the portable terminal 1. The portable control unit 7 of the portable terminal 1 performs the operation illustrated in FIG. 8 by controlling each related unit. FIGS. 9 and 10 illustrate the operations of the digital camera 2. The camera control unit 13 of the digital camera 2 performs the operations illustrated in FIGS. 9 and 10 by controlling each related unit.

First, the operation of the portable terminal 1 will be described using FIG. 8. When an application of camera processing is executed in the portable terminal 1, the portable control unit 7 executes the camera processing S1. In the camera processing S1, the portable control unit 7 initially executes initial setting S2 for setting an initial value in each unit of the portable terminal 1.

After the initial setting S2, the portable control unit 7 controls the wireless communication unit 6 to execute a camera connection S3 in which a wireless connection with the digital camera 2 is performed. After the camera connection S3, the portable control unit 7 controls the display unit 5 to execute a portable imaging image display process S4 of displaying an image as illustrated in FIG. 4 on the display unit 5 based on the imaging data generated by the portable imaging unit 3.

After the portable imaging image display process S4, the portable control unit 7 executes an information generation process S5 of generating the imaging area information or the imaging target information in the above-described method. After the information generation process S5, the portable control unit 7 controls the wireless communication unit 6 to execute an information transmission process S6 of wirelessly transmitting the imaging area information or the imaging target information to the digital camera 2.

After the information transmission process S6, the portable control unit 7 controls the wireless communication unit 6 based on the instruction of imaging execution of the operator to execute an imaging execution instruction process S7 of transmitting imaging execution instruction information for issuing an instruction to execute imaging to the digital camera 2. After the imaging execution instruction process S7, the portable control unit 7 controls the wireless communication unit 6 to execute an imaging data reception process S8 of wirelessly receiving imaging data wirelessly transmitted from the digital camera 2 after the digital camera 2 has executed imaging.

After the imaging data reception process S8, the portable control unit 7 controls the display unit 5 to execute a received image display process S9 of displaying an image based on imaging data wirelessly received from the digital camera 2 on the display unit 5. After the received image display process S9, the portable control unit 7 executes a determination process S10 of determining whether to end imaging based on a result of detecting the instruction from the operator as to whether to continue or end the imaging in the operation detection unit 8.

The portable control unit 7 executes imaging continuation S11 when the imaging continues, and executes a camera disconnection S12 when the imaging ends. In either of the imaging continuation S11 and the camera disconnection S12, the portable control unit 7 controls the wireless communication unit 6 to wirelessly transmit information including instruction content of the operator to the digital camera 2.

After the imaging continuation S11, the portable control unit 7 continues the process by returning to the portable imaging image display process S4. On the other hand, after the camera disconnection S12, the portable control unit 7 ends the camera processing after disconnecting the wireless communication with the digital camera 2 (S13).

Next, the operation of the digital camera 2 will be described using FIGS. 9 and 10. When the digital camera 2 is activated, the camera control unit 13 executes an overall process S21. In the overall process S21, the camera control unit 13 initially executes initial setting S22 in which an initial value is set in each unit of the digital camera 2.

After the initial setting S22, the camera control unit 13 controls the wireless communication unit 12 to execute a portable connection S23 in which a connection with the portable terminal 1 is performed. The portable connection S23 is a process corresponding to the camera connection S3 to be performed by the portable terminal 1.

After the portable connection S23, the camera control unit 13 controls the wireless communication unit 12 to execute an information reception process S24 of wirelessly receiving the imaging area information or the imaging target information wirelessly transmitted from the portable terminal 1. The information reception process S24 is a process corresponding to the information transmission process S6 performed by the portable terminal 1. After the information reception process S24, the camera control unit 13 executes an imaging process 1 (S25) using the received imaging area information or imaging target information Hereinafter, the imaging process 1 (S25) to be performed in this embodiment will be described using FIG. 10. FIG. 10 illustrates details of the imaging process 1 (S25). In the imaging process 1 (S25) illustrated in FIG. 10, the camera control unit 13 initially controls the wireless communication unit 12 to execute execution instruction waiting S41 in which it waits for the imaging execution instruction information wirelessly transmitted from the portable terminal 1 to be received. When the portable terminal 1 performs the imaging execution instruction process S7, the wireless communication unit 12 receives the imaging execution instruction information and therefore the camera control unit 13 ends the execution instruction waiting S41 and executes an imaging execution process S42. In the imaging execution process S42, the camera control unit 13 controls the camera imaging unit 10 to execute an imaging process.

After the imaging execution process S42, the camera control unit 13 executes a transmission data generation process S43 of generating transmission data to be transmitted from the digital camera 2 to the portable terminal 1 according to the imaging area information or the imaging target information. In the transmission data generation process S43, the image processing unit 11 generates transmission data corresponding to the imaging area information or the imaging target information by receiving an instruction from the camera control unit 13. After the transmission data generation process S43, the camera control unit 13 executes a process by returning to the overall process S21 (S44).

When the imaging process 1 (S25) ends, the camera control unit 13 controls the wireless communication unit 12 to execute an imaging data transmission process S26 of wirelessly transmitting transmission data generated in the imaging process 1 (S25) to the portable terminal 1. In correspondence with the imaging data transmission process S26, the imaging data reception process S8 is executed by the portable terminal 1.

After the imaging data transmission process S26, the camera control unit 13 controls the wireless communication unit 12 to execute an instruction content reception process S27. The instruction content reception process S27 is a process corresponding to the imaging continuation S11 and the camera disconnection S12 to be performed by the portable terminal 1, and is a process of wirelessly receiving information representing the instruction of the imaging continuation or the imaging end from the portable terminal 1.

After the instruction content reception process S27, the camera control unit 13 executes a determination process S28 of determining whether to end the imaging according to instruction content represented by information received from the portable terminal 1 in the instruction content reception process S27. When the imaging continues, the camera control unit 13 continues the process by returning to the information reception process S24. When the imaging ends, the camera control unit 13 controls the wireless communication unit 12 to end an operation of the digital camera 2 after executing the portable disconnection S29 (S30). The portable disconnection S29 is a process corresponding to the camera disconnection S12 performed by the portable terminal 1.

Although the imaging data is transmitted in the processes illustrated in FIGS. 8 and 9, the imaging system may not transmit the imaging data. For example, when the digital camera 2 has an internal memory or when an external memory is connected to the digital camera 2, the digital camera 2 may record imaging data corresponding to an image illustrated in FIG. 5 or 7 in the internal memory or the external memory.

As described above, according to this embodiment, an operation of designating an imaging area or an imaging target is performed for an image captured by the portable terminal 1, and imaging area information representing the imaging area or imaging target information representing the imaging target is wirelessly transmitted to the digital camera 2. Thereby, because the operator can designate the imaging area or the imaging target before an image captured by the digital camera 2 is wirelessly received by the portable terminal 1, it is possible to reduce a delay of imaging in the digital camera 2. In addition, it is possible to reduce power consumption in the digital camera 2 because it is possible to eliminate a process in which the digital camera 2 generates imaging data to be used in a display of an image in the portable terminal 1 and a process in which the digital camera 2 wirelessly transmits the generated imaging data to the portable terminal 1.

(Second Embodiment)

Next, the second embodiment of the present invention will be described. This embodiment is an example in which a timing (imaging execution time point) of a shutter trigger of a digital camera 2 is automatically determined. For example, the digital camera 2 automatically executes imaging at a desired timing such as when a smiling face of a person has been detected. Specifically, a portable terminal 1 issues an instruction of imaging execution after transmitting imaging execution condition information for determining the imaging execution time point of the digital camera 2 to the digital camera 2. After receiving the imaging execution instruction, the digital camera 2 performs imaging at a point in time at which an image designated in an imaging range is consistent with an imaging execution condition represented by the imaging execution condition information.

(Configuration)

Configurations of the portable terminal 1 and the digital camera 2 are the same as those of the respective devices in the first embodiment. However, in the portable terminal 1, an information generation unit 7a of a portable control unit 7 generates imaging execution condition information based on an instruction detected by an operation detection unit 8. The imaging execution condition information of this embodiment is information about a state of an image of an imaging area represented by imaging area information or an image of an imaging target represented by imaging target information. In addition, in the digital camera 2, an imaging control unit 13b of a camera control unit 13 causes a camera imaging unit 10 to execute imaging at an imaging timing based on the imaging execution condition information and generate imaging data.

(Operation Details)

Figure 11:
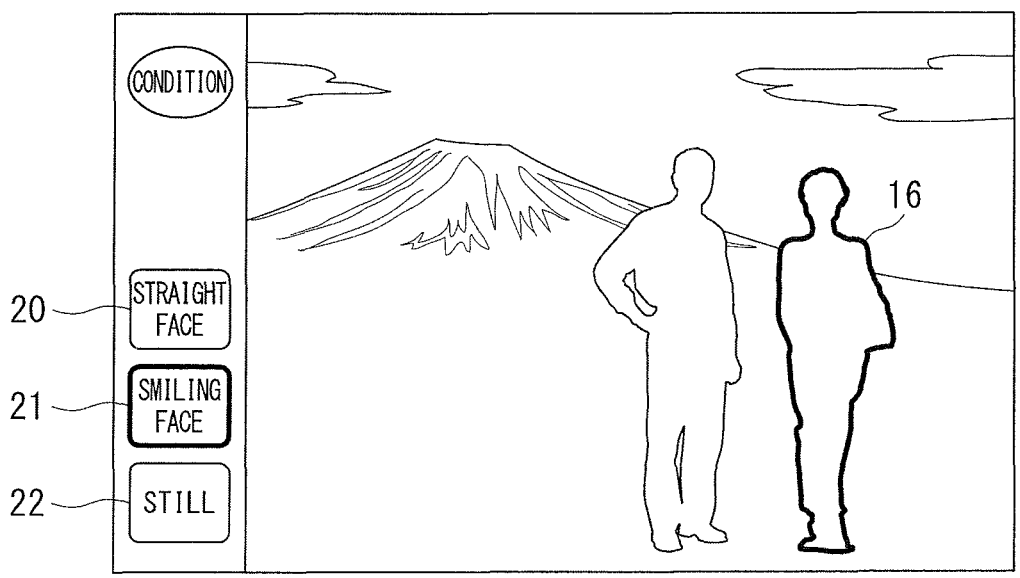
FIG. 11 is a reference diagram illustrating an image displayed by a portable terminal according to a second embodiment of the present invention.

FIG. 11 is an example of an image displayed on a display unit 5 of the portable terminal 1 when the operator indicates an imaging execution condition. In FIG. 11, a condition setting screen for allowing the operator to indicate the imaging execution condition is displayed. FIG. 11 illustrates an image when the imaging execution condition is indicated in a state in which a target button 18 has been selected and a person 16 has been selected as an imaging target when the image illustrated in FIG. 6 is displayed.

As illustrated in FIG. 11, buttons displayed on the condition setting screen are different from the buttons illustrated in FIGS. 4 and 6. In the example illustrated in FIG. 11, three types of buttons of a straight face button 20, a smiling face button 21, and a still button 22 are set as buttons for indicating the imaging execution condition. The straight face button 20 is a button for indicating that the imaging is performed when the selected person has a straight face as the imaging execution condition. The smiling face button 21 is a button for indicating that the imaging is performed when the selected person is smiling as the imaging execution condition. The still button 22 is a button for indicating that the imaging is performed when the selected person becomes still as the imaging execution condition.

As illustrated in FIG. 11, if the smiling face button 21 is selected, after the selected smiling face button 21 is displayed with emphasis, the imaging execution condition information representing that the imaging is executed when the selected person smiles is transmitted to the digital camera 2. Thereafter, the display screen returns to the state illustrated in FIG. 6. When the shutter button 19 is selected, the imaging execution instruction information is transmitted to the digital camera 2.

Figure 12:
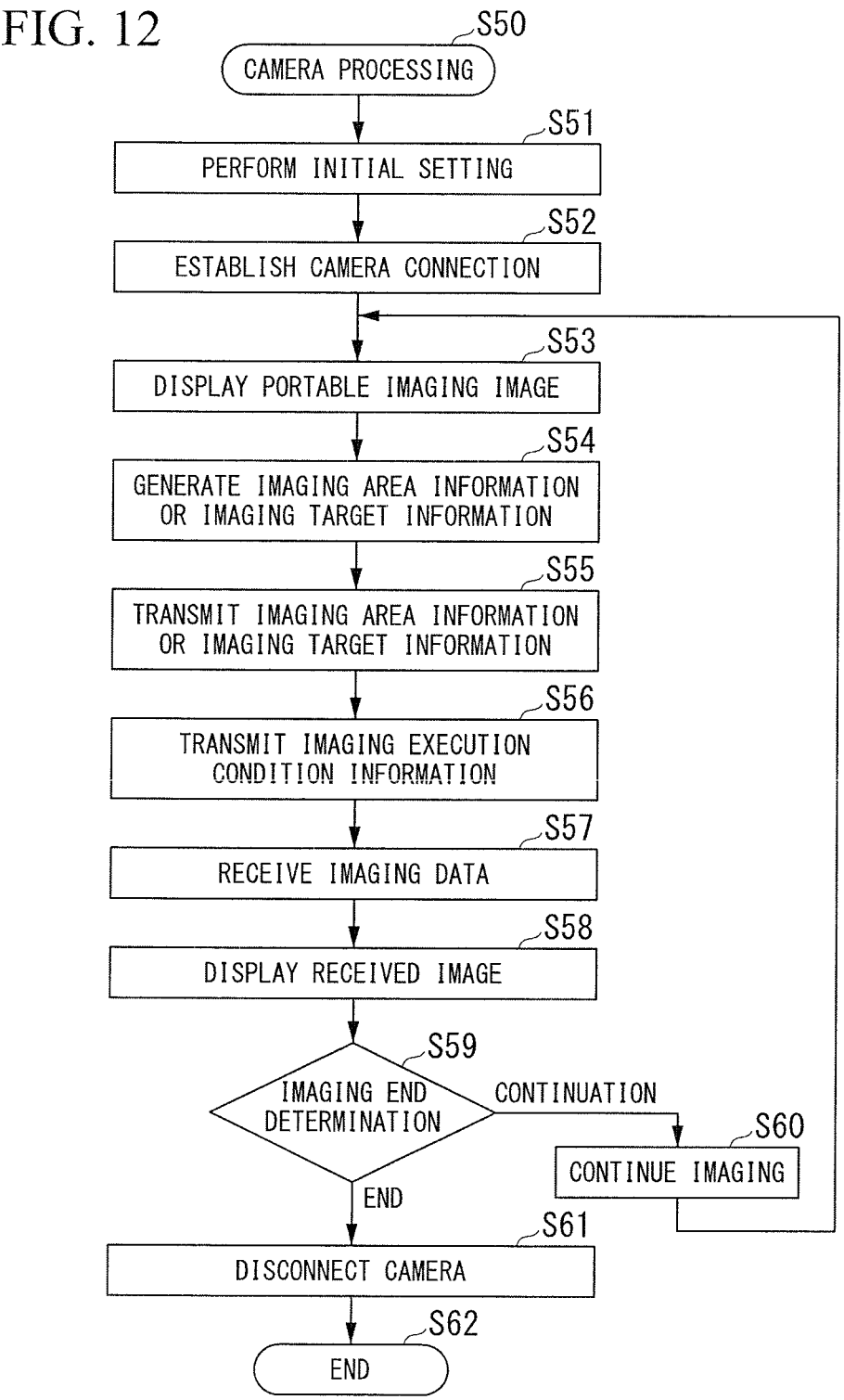
FIG. 12 is a flowchart illustrating a procedure of an operation of the portable terminal according to the second embodiment of the present invention.

FIG. 12 illustrates an operation of the portable terminal 1. In camera processing S50 illustrated in FIG. 12, the imaging execution instruction process S7 in FIG. 8 is changed to a transmission process S56 of imaging execution condition information. In the transmission process S56 of the imaging execution condition information, the portable control unit 7 controls the wireless communication unit 6 to wirelessly transmit the imaging execution condition information to the digital camera 2. Aside from the above-described operations, operations S51 to S55 and S57 to S62 are similar to operations S2 to S13 illustrated in FIG. 8, and thus description thereof is omitted.

Figure 13:
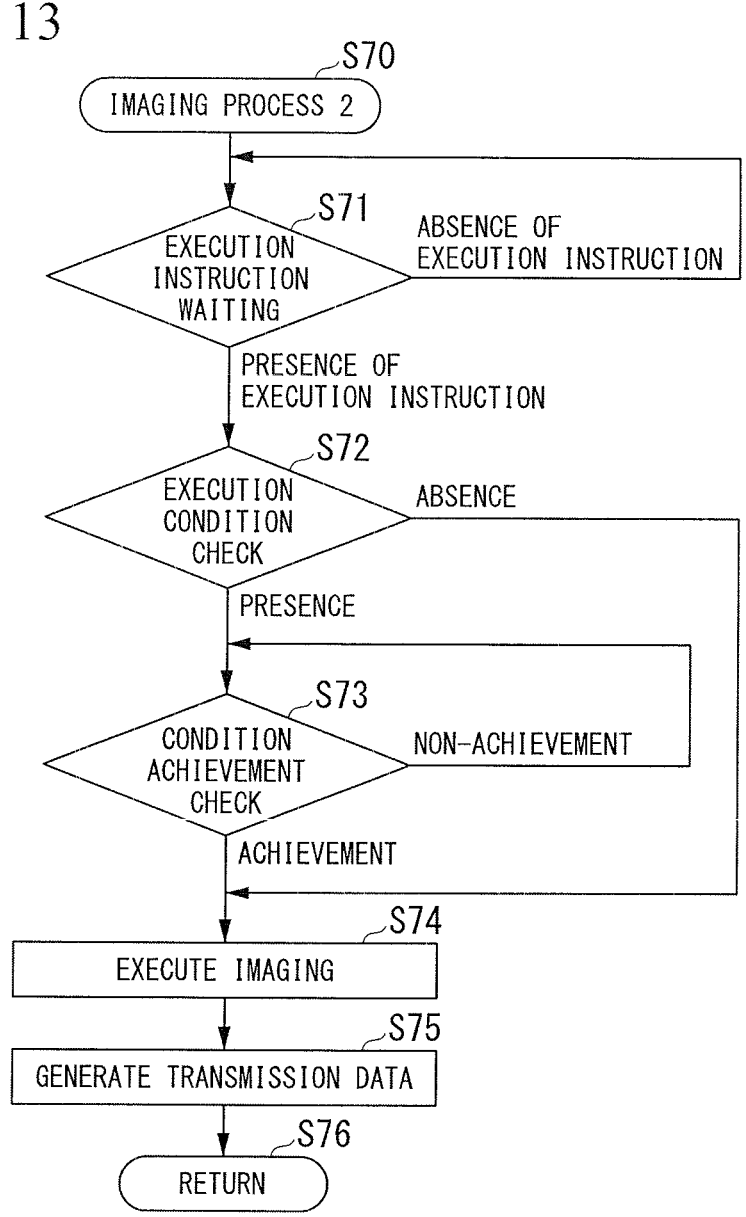
FIG. 13 is a flowchart illustrating a procedure of an operation of a digital camera according to the second embodiment of the present invention.

The operation of the digital camera 2 according to this embodiment is implemented by replacing the imaging process 1 (S25) among the processes illustrated in FIG. 9 with an imaging process 2 (S70) illustrated in FIG. 13. FIG. 13 illustrates details of the imaging process 2 (S70). Upon receiving the imaging execution instruction information, the digital camera 2 executes the imaging process 2 (S70) illustrated in FIG. 13.

A process illustrated in FIG. 13 is a process to be executed by the camera control unit 13 of the digital camera 2. In addition, image processing of detecting the smiling face or the like which is an imaging execution condition is executed by the image processing unit 11. When the image processing unit 11 notifies the camera control unit 13 of a detection result of the smiling face or the like, imaging is executed.

The imaging process 2 (S70) will be described using FIG. 13. The imaging process 2 (S70) is different from the imaging process 1 (S25) in that imaging is executed at a point in time at which the condition designated in the imaging execution condition information has been achieved. Specifically, the camera control unit 13 executes execution instruction waiting S71 in which it waits for an imaging execution instruction. When the imaging execution instruction information has been wirelessly received from the portable terminal 1, the camera control unit 13 executes an execution condition check process S72 of checking the presence/absence of the imaging execution condition without immediately executing the imaging.

When there is no imaging execution condition, the camera control unit 13 controls the camera imaging unit 10 to execute an imaging execution process S74. When there is an imaging execution condition such as a smiling face, the camera control unit 13 executes a condition achievement check process S73 of determining whether the imaging execution condition has been achieved based on a result of image processing by the image processing unit 11. The detection of the imaging execution condition is executed by the image processing unit 11, and the camera control unit 13 is notified of the result. When the imaging execution condition has not been achieved, the camera control unit 13 continues a condition achievement check process S73. An imaging execution process S74 is performed at a point in time at which the imaging execution condition has been achieved.

After the imaging execution process S74, the camera control unit 13 executes a transmission data generation process S75 of generating transmission data to be transmitted from the digital camera 2 to the portable terminal 1 according to imaging area information or imaging target information. In the transmission data generation process S75, the image processing unit 11 receives an instruction from the camera control unit 13 and generates transmission data corresponding to the imaging area information or imaging target information. After the transmission data generation process S75, the camera control unit 13 executes the process by returning to the overall process S21 (S76).

According to the above-described process, the digital camera 2 automatically performs imaging at the moment at which the person 16 begins smiling in the case of the presence description.

Because imaging is executed when the state of the image becomes a state (a state of the smiling face or the like) in which the imaging execution condition is shown, the imaging can be executed at a desired timing according to this embodiment as described above.

(Third Embodiment)

Next, the third embodiment of the present invention will be described. In this embodiment, the portable terminal 1 predicts a point in time at which the state of an imaging target becomes a state of a desired arrangement (positional relationship) and adjusts a transmission timing of imaging execution instruction information to be transmitted by the portable terminal 1 to the digital camera 2 in consideration of a time required for wireless communication of imaging execution instruction information based on the predicted timing. Thereby, it is possible to optimally adjust the imaging timing in the digital camera 2.

In addition, in this embodiment, the portable terminal 1 instructs the digital camera 2 to start focus adjustment before the predicted point in time at which the state of the imaging target becomes the desired arrangement state. Thereby, a start timing of focus processing is optimized (Configuration)

Figure 14:
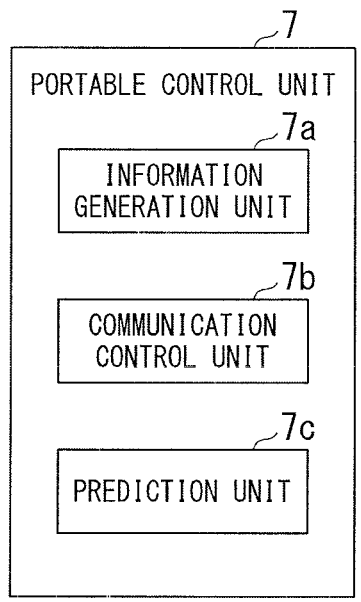
FIG. 14 is a block diagram illustrating a functional configuration of a portable control unit provided in a portable terminal according to a third embodiment of the present invention.

The configuration of the portable terminal 1 is the same as the configuration of the portable terminal 1 in the first embodiment except for the functional configuration of the portable control unit 7. FIG. 14 illustrates the functional configuration of the portable control unit 7. The portable control unit 7 implements at least functions of an information generation unit 7a, a communication control unit 7b, and a prediction unit 7c. The information generation unit 7a is the same as that of the first embodiment.

The prediction unit 7c predicts (estimates) an imaging timing at which the state of the image of the imaging area or the imaging target becomes a predetermined state based on imaging data corresponding to an image displayed on the display unit 5. Specifically, as will be described later, the prediction unit 7c predicts a time from a start time point of a process related to prediction to an imaging timing at which the imaging area or the imaging target is in a predetermined state based on imaging data corresponding to an image displayed on the display unit 5, and predicts a transmission timing of the imaging execution instruction information based on the predicted time and a communication delay time according to wireless communication. In an example of this embodiment, the imaging timing is a timing at which the imaging target moves to a predetermined position of the imaging area.

The communication control unit 7b causes the wireless communication unit 6 to wirelessly transmit imaging execution instruction information to the digital camera 2 at a transmission timing predicted by the prediction unit 7c. That is, the communication control unit 7b causes the wireless communication unit 6 to wirelessly transmit imaging execution instruction information to the digital camera 2 at a point in time which is at least a time necessary to wirelessly communicate with the portable terminal 1 earlier than the predicted imaging timing. In addition, the communication control unit 7b causes the wireless communication unit 6 to wirelessly transmit focus adjustment instruction information for issuing a focus adjustment instruction to the digital camera 2 before wirelessly transmitting the imaging execution instruction information.

The configuration of the digital camera 2 is the same as that of the digital camera 2 in the first embodiment.

(Operation Details)

Figure 15:
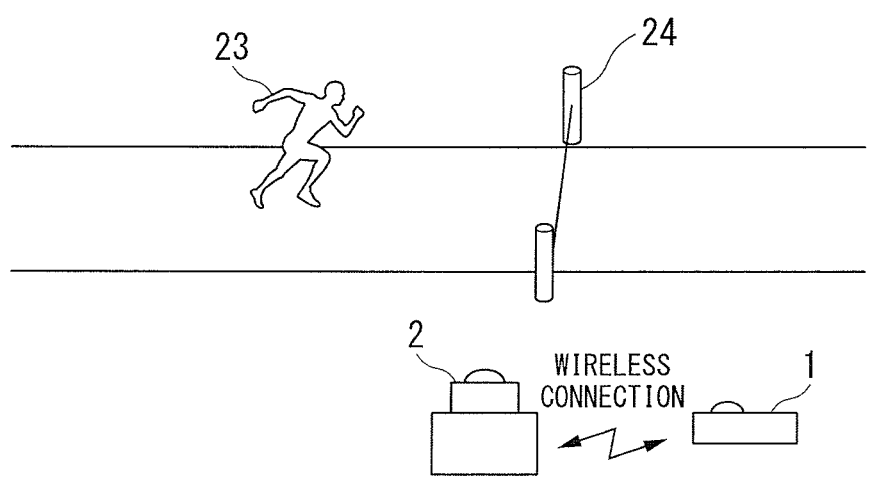
FIG. 15 is a reference diagram illustrating an operation situation of an imaging system according to the third embodiment of the present invention.

FIG. 15 illustrates an operation situation of the imaging system according to this embodiment. In FIG. 15, in a state in which the portable terminal 1 and the digital camera 2 have been wirelessly connected, the two devices perform imaging toward a person 23. In addition, in FIG. 15, the digital camera 2 is configured to perform imaging at the moment at which the person 23 enters a goal 24.

Figure 16:
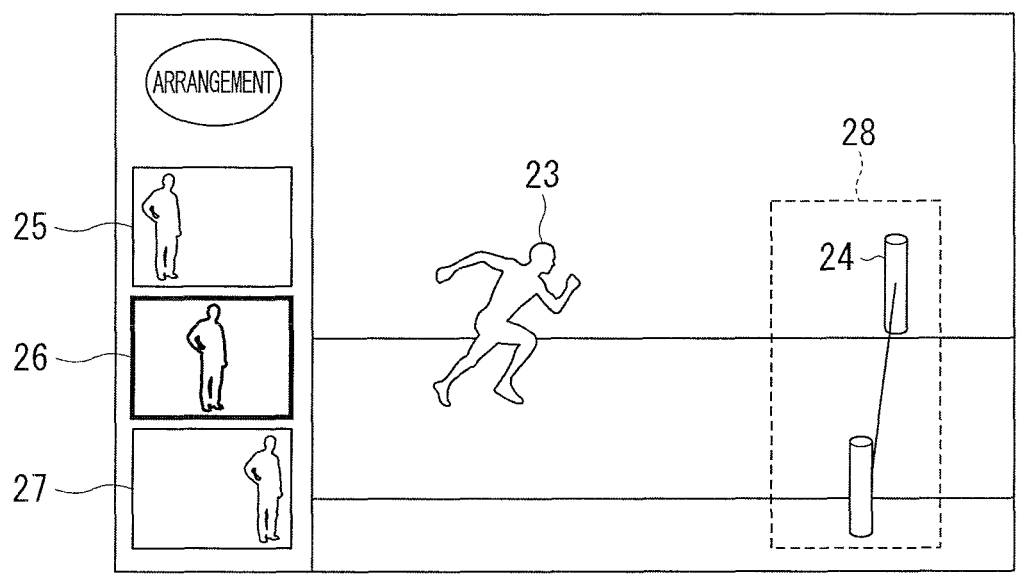
FIG. 16 is a reference diagram illustrating an image displayed by the portable terminal according to the third embodiment of the present invention.

FIG. 16 is an example of an image displayed by the portable terminal 1 on the display unit 5 in the state illustrated in FIG. 15. Arrangements 25, 26, and 27 are displayed on the left end of the image. If the operator touches and selects a desired arrangement, the selected arrangement is displayed with emphasis.

FIG. 16 illustrates a state in which the operator designates an imaging range 28 in the vicinity of the goal 24 and selects the arrangement 26 serving as a condition of starting imaging. The arrangement 26 represents a condition that the person be at the center of a part designated as the imaging range. In this connection, the arrangement 25 represents a condition that the person be at the left end of the part designated as the imaging range. In addition, the arrangement 27 represents a condition that the person be at the right end of the part designated as the imaging range When the arrangement 26 has been designated in the portable terminal 1, it is possible to designate a person serving as the arrangement 26 and the person 23 is designated in the example of this embodiment. Likewise, even when the arrangements 25 and 27 have been designated, it is possible to designate the person serving as the arrangements 25 and 27.

Figure 17:
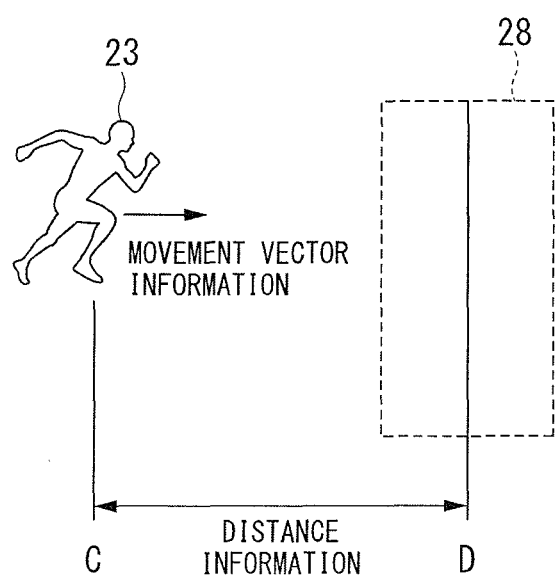
FIG. 17 is a reference diagram illustrating a method of predicting a point in time at which a state of an imaging target becomes a desired arrangement state in the third embodiment of the present invention.

FIG. 17 illustrates a method in which the portable terminal 1 predicts a point in time at which a state of an imaging target becomes a desired arrangement state. A method of predicting the point in time at which the state of the person 23 becomes the state of the arrangement 26 will be described using FIG. 17.

A point C of FIG. 17 indicates a current place of the person 23. A point D indicates a center position of an imaging range 28. A point in time at which a display screen of the portable terminal 1 is in the state of FIG. 17 is defined as a start time point, and a time until the person 23 moves to the center of the imaging range 28 and is in a state of the arrangement 26 is defined as an elapsed time t1. The start time point is a point in time at which the imaging range 28 is designated, the arrangement 26 is selected, and the person 23 is designated. The elapsed time t1 is obtained from movement vector information representing a movement speed of the person 23 at a current time point and information about a distance between points C and D.

Various methods have been devised as a method of obtaining the movement vector information, and these will not be described in detail. For example, it is possible to detect a movement vector by obtaining a position of an imaging target in imaging data from the portable imaging unit 3 for every frame. In this embodiment, the image processing unit 11 detects movement vector information by processing imaging data Next, a method of detecting a communication delay time t2 related to wireless communication from the portable terminal 1 to the digital camera 2 will be described There are various methods as a method of detecting a time required for wireless communication between devices and any such method may be used. For example, a method in which the portable terminal 1 measures a time until a response from the digital camera 2 is received after the portable terminal 1 performs transmission for measurement to the digital camera 2 and sets half the time as a communication delay time may be used The portable terminal 1 calculates the elapsed time t1 and the communication delay time t2 according to the above-described method and transmits imaging execution instruction information to the digital camera 2 at a transmission timing based on the calculated time. Specifically, a timing t at which the imaging execution instruction information is transmitted is obtained by $t=t1-t2$.

The operation of the portable terminal 1 according to this embodiment is substantially the same as the operation illustrated in FIG. 8. Hereinafter, only an operation different from the operation illustrated in FIG. 8 will be described. The communication control unit 7b controls the wireless communication unit 6 at the above-described timing t to execute the imaging execution instruction process S7 of transmitting the imaging execution instruction information to the digital camera 2. Thereby, the imaging execution instruction information is transmitted to the digital camera 2 at a desired timing.

In addition, the start instruction of the focus adjustment for the digital camera 2 is issued at a point in time at which an imaging range or an imaging target has been designated and imaging area information or imaging target information has been transmitted. Specifically, at a point in time at which the information transmission process S6 has been executed, the portable control unit 7 controls the wireless communication unit 6 to wirelessly transmit focus adjustment instruction information for issuing a focus adjustment instruction to the digital camera 2. Thereby, the focus adjustment start instruction is issued at a point in time at which a desired imaging area or imaging target has been specified. Thus, in the digital camera 2, the focus adjustment ends before the imaging execution instruction to be issued thereafter. The portable terminal 1 may simultaneously wirelessly transmit the imaging area information or the imaging target information and the focus adjustment instruction information to the digital camera 2.

The operations of the digital camera 2 according to this embodiment are substantially the same as the operations illustrated in FIGS. 9 and 10. Hereinafter, only operations different from the operations illustrated in FIGS. 9 and 10 will be described. In this embodiment, after executing the information reception process S24, the camera control unit 13 controls the wireless communication unit 12 to wirelessly receive the focus adjustment instruction information wirelessly transmitted from the portable terminal 1. The camera control unit 13 receiving the focus adjustment instruction information controls the camera imaging unit 10 to perform focus adjustment.

Figure 18:
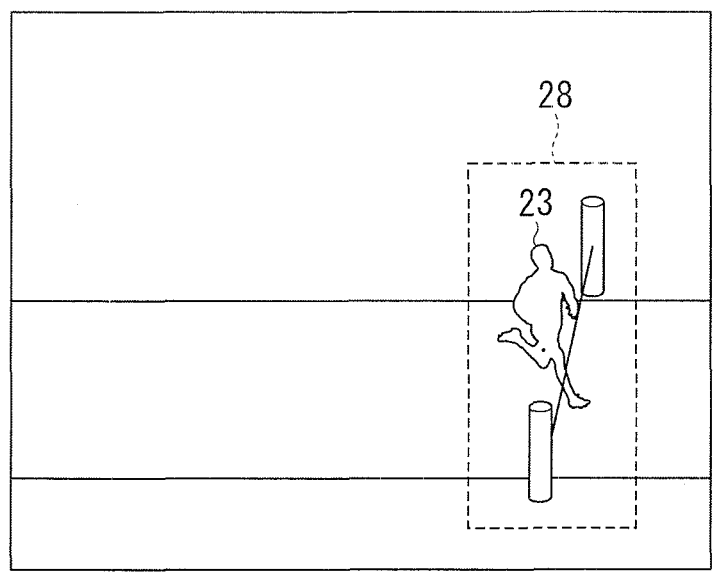
FIG. 18 is a reference diagram illustrating an image captured by a digital camera according to the third embodiment of the present invention.
Figure 19:
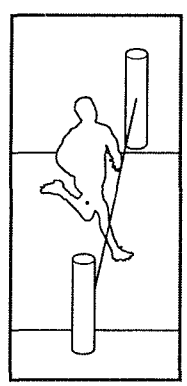
FIG. 19 is a reference diagram illustrating an image transmitted by the digital camera according to the third embodiment of the present invention.

In addition, the imaging execution process S42 is executed immediately when the camera control unit 13 receives imaging execution instruction information in the imaging process 1 (S25). FIG. 18 illustrates an image captured by the digital camera 2 when an imaging execution instruction has been issued from the portable terminal 1 at the above-described timing. As illustrated in FIG. 18, imaging is performed at a timing at which the person 23 has reached substantially the center of the imaging range 28. FIG. 19 illustrates an image to be transmitted by the digital camera 2 to the portable terminal 1. As illustrated in FIG. 19, an image obtained by extracting a part of the imaging range 28 from the image illustrated in FIG. 18 is transmitted to the portable terminal 1.

As described above, according to this embodiment, the imaging execution instruction information is wirelessly transmitted from the portable terminal 1 to the digital camera 2 at a transmission timing based on the predicted imaging timing and the communication delay time according to the wireless communication. Thereby, the digital camera 2 can execute imaging at an appropriate imaging timing.

In addition, the digital camera 2 can appropriately execute the focus adjustment by wirelessly transmitting the focus adjustment instruction information before the imaging execution instruction information is wirelessly transmitted from the portable terminal 1 to the digital camera 2.

(Fourth Embodiment)

Next, the fourth embodiment of the present invention will be described. In this embodiment, a method of controlling a zoom state of the digital camera to which an optical zoom function is added will be described (Configuration)

Figure 20A:
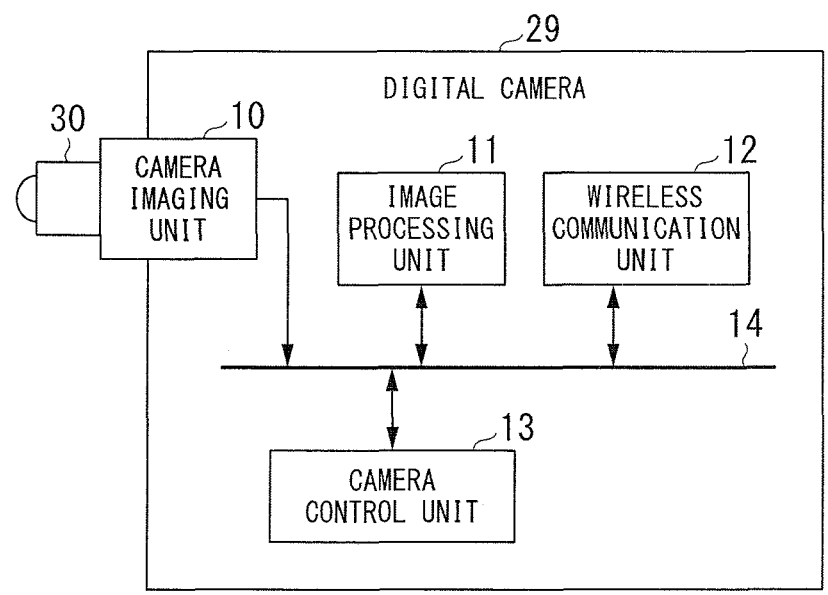
FIGS. 20A and 20B are block diagrams illustrating a configuration of a digital camera according to a fourth embodiment of the present invention.
Figure 20B:
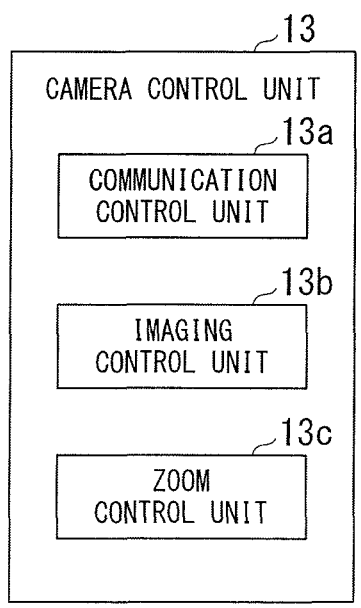

FIGS. 20A and 20B illustrate a configuration of a digital camera 29 according to this embodiment. As illustrated in FIG. 20A, the digital camera 29 includes a camera imaging unit 10, an image processing unit 11, a wireless communication unit 12, a camera control unit 13, a data bus 14, and an optical zoom unit 30. In the digital camera 29, the optical zoom unit 30 is connected to the camera imaging unit 10. The optical zoom unit 30 performs optical zoom for adjusting a zoom state of an optical system. Because a configuration other than the optical zoom unit 30 is the same as the configuration illustrated in FIG. 2, description thereof is omitted.

In this embodiment, the digital camera 29 waits by setting zoom magnification to predetermined magnification at which a wide range can be imaged before imaging area information or imaging target information is transmitted from the portable terminal 1. In addition, the digital camera 29 performs an enlargement process while searching for the imaging range at a point in time at which the imaging range or the imaging target has been indicated and waits for an instruction of imaging execution while maintaining a bare zoom state in which an image covering the imaging range can be captured.

In addition, when imaging is continuously performed, the digital camera 29 starts to search for the imaging range while temporarily moving the optical zoom unit 30 to a wide angle side at a point in time at which the imaging area information or the imaging target information for the next imaging has been received. Thereafter, the digital camera 29 waits for an instruction of imaging execution while maintaining a bare zoom state in which an image covering the imaging range can be captured.

FIG. 20B illustrates a functional configuration of the camera control unit 13. The camera control unit 13 implements at least functions of a communication control unit 13a, an imaging control unit 13b, and a zoom control unit 13c. The zoom control unit 13c sets magnification of the optical zoom to first magnification which is less than or equal to predetermined magnification until the wireless communication unit 12 wirelessly receives the imaging area information or the imaging target information. The predetermined magnification, for example, is magnification of a wide angle end or magnification in the vicinity of the wide angle end and before the wide angle end. In addition, after the wireless communication unit 12 has wirelessly received the imaging area information or the imaging target information, the zoom control unit 13c sets the magnification of the optical zoom to second magnification which is greater than the predetermined magnification. More specifically, after the wireless communication unit 12 has wirelessly received the imaging area information or the imaging target information, the zoom control unit 13c sets the magnification of the optical zoom to the second magnification which is greater than the predetermined magnification and can cover all of the imaging area represented by the imaging area information or the imaging target represented by the imaging target information.

After the magnification of the optical zoom has been set to the second magnification, the imaging control unit 13b causes the camera imaging unit 10 to generate imaging data corresponding to an image including the imaging area represented by the imaging area information or the imaging target represented by the imaging target information. The communication control unit 13a is the same as that of the first embodiment.

The configuration of the portable terminal 1 is the same as the configuration of the portable terminal 1 in the first embodiment.

(Operation Details)

Figure 21:
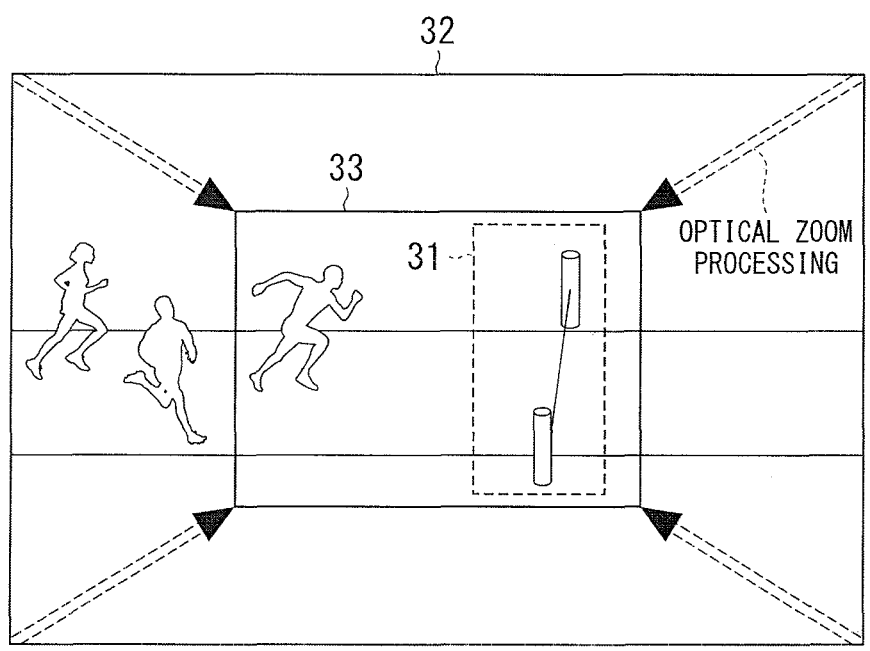
FIG. 21 is a reference diagram illustrating an image captured by the digital camera according to the fourth embodiment of the present invention.

FIG. 21 illustrates an image captured by the digital camera 29. Zoom processing to be performed by the digital camera 29 will be described using FIG. 21.

In FIG. 21, a frame 32 illustrates a range of imaging data output from the camera imaging unit 10 in a state in which the optical zoom unit 30 is at the wide angle end. In addition, a frame 33 illustrates a range of imaging data output from the camera imaging unit 10 after the zoom processing. An imaging range 31 is an imaging range designated from the portable terminal 1.

As illustrated in FIG. 21, when the imaging range 31 is designated from the portable terminal 1, the digital camera 29 moves the optical zoom unit 30 from the wide angle end (frame 32) to a position of the frame 33 which barely covers the imaging range 31. According to the above-described process, it is possible to perform imaging in an optimum zoom state in which the imaging range 31 is covered.

Figure 22:
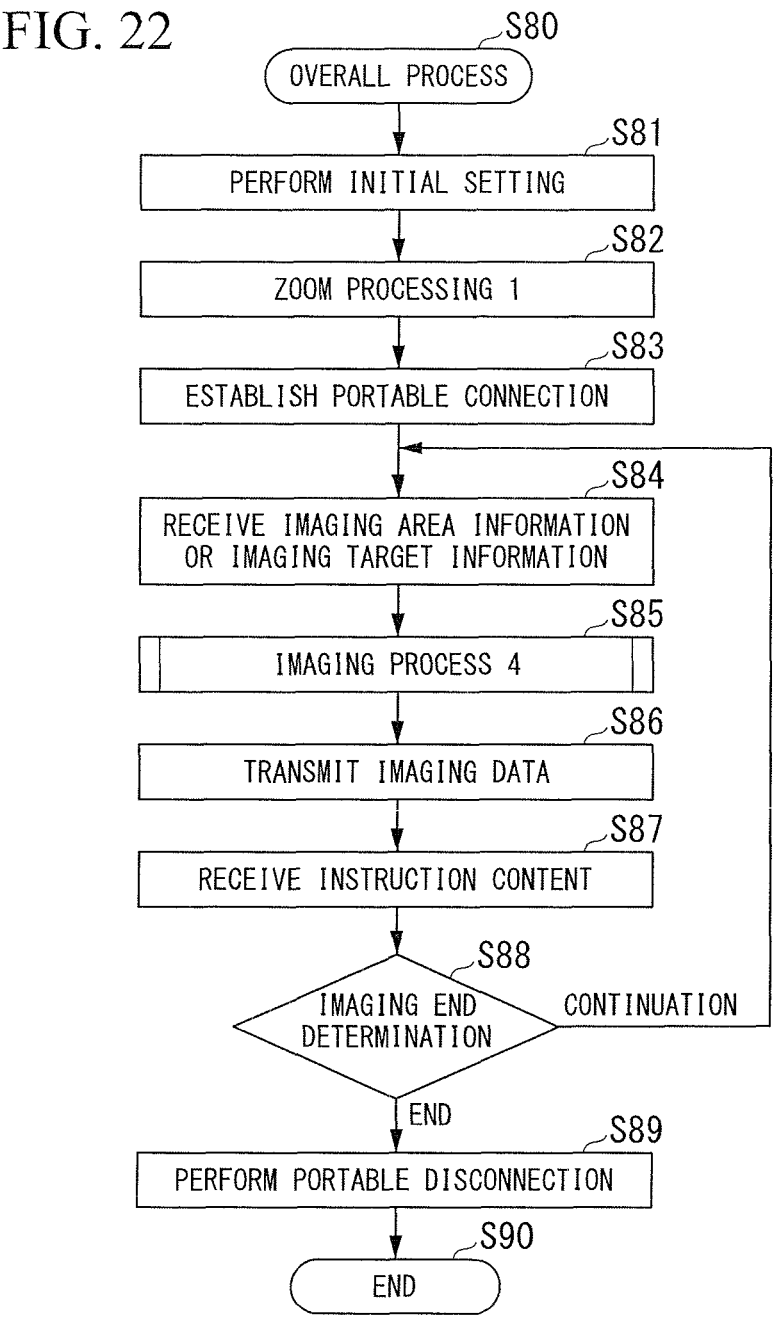
FIG. 22 is a flowchart illustrating a procedure of an operation of the digital camera according to the fourth embodiment of the present invention.

FIG. 22 illustrates the operation of the digital camera 2. In an overall process S80 illustrated in FIG. 22, zoom processing 1 (S82) is added to the overall process S21 in FIG. 9 and the imaging process 1 (S25) is changed to an imaging process 4 (S85). In the zoom processing 1 (S82) to be performed after the initial setting S81, the camera control unit 13 sets the zoom magnification to the first magnification. Thereby, the digital camera 29 waits by setting the zoom magnification to predetermined magnification at which a wide range can be imaged before the imaging area information or the imaging target information is transmitted from the portable terminal 1. The imaging process 4 (S85) will be described using FIG. 23. Aside from the above-described operations, operations S81, S83 and S84, and S86 to S90 are the same as the operations S2 to S13 illustrated in FIG. 9, and thus description thereof is omitted.

Figure 23:
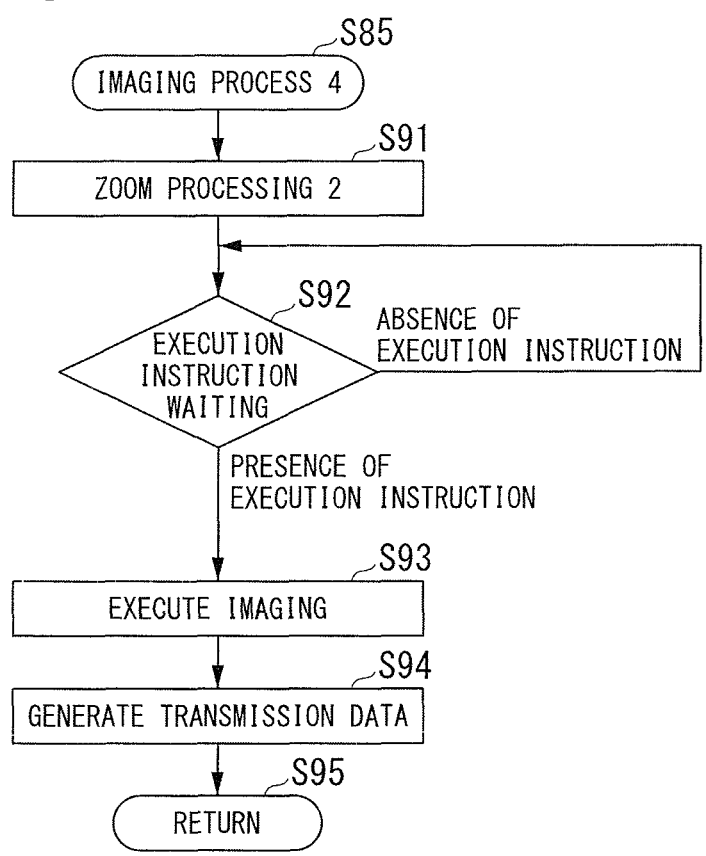
FIG. 23 is a flowchart illustrating a procedure of an operation of the digital camera according to the fourth embodiment of the present invention.

FIG. 23 illustrates details of the imaging process 4 (S85). In the imaging process 4 (S85) illustrated in FIG. 23, zoom processing 2 (S91) is added to the imaging process 1 (S25) in FIG. 10. In the zoom processing 2 (S91) to be performed before the execution instruction waiting S92, the camera control unit 13 sets the zoom magnification to the second magnification which is greater than the first magnification set in the zoom processing 1 (S82). Thereby, the digital camera 29 waits for an instruction of imaging execution while maintaining the bare zoom state in a state in which an image to cover the imaging range can be captured. Because operations S92 to S95 other than the above-described operations are similar to the operations S41 to S44 illustrated in FIG. 10, description thereof is omitted.

As described above, according to this embodiment, the digital camera 2 decreases the zoom magnification until the imaging area information or the imaging target information is wirelessly received. In addition, after the imaging area information or the imaging target information has been wirelessly received, the digital camera 2 increases the zoom magnification so that the imaging range corresponding to the imaging area information or the imaging target information can be imaged. Thereby, the digital camera 2 can execute imaging in an appropriate zoom state.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An imaging control terminal comprising:
a wireless communication interface configured to wirelessly communicate with an imaging terminal including a digital camera;
an imaging module configured to generate imaging data;
a display interface configured to display an image corresponding to the imaging data generated by the imaging module;
an operation interface configured to receive an operation of an operator designating an imaging area or an imaging target to be imaged by the imaging terminal for the image captured by the imaging module before an image captured by the imaging terminal is wirelessly received by the imaging control terminal in a state that the imaging control terminal and the imaging terminal are wirelessly connected;

an information generation unit configured to generate imaging area information representing the imaging area or imaging target information representing the imaging target; and a communication control unit configured to cause the wireless communication interface to wirelessly transmit the imaging area information or the imaging target information to the imaging terminal.

2. The imaging control terminal according to claim 1, wherein the imaging area information or the imaging target information is information to be used in a process of determining a range of an image to be wirelessly transmitted by the imaging terminal to the imaging control terminal.

3. The imaging control terminal according to claim 1, wherein the information generation unit generates imaging execution condition information representing an imaging execution condition when the imaging terminal performs imaging, and the communication control unit causes the wireless communication interface to wirelessly transmit the imaging execution condition information to the imaging terminal.

4. The imaging control terminal according to claim 3, wherein the imaging execution condition information is information about a state of an image of the imaging area or the imaging target.

5. An imaging control terminal comprising:

a wireless communication interface configured to wirelessly communicate with an imaging terminal;

an imaging module configured to generate imaging data;

a display interface configured to display an image corresponding to the imaging data generated by the imaging module;

an operation interface configured to receive an operation of an operator designating an imaging area or an imaging target to be imaged by the imaging terminal for the image;

an information generation unit configured to generate imaging area information representing the imaging area or imaging target information representing the imaging target;

a communication control unit configured to cause the wireless communication interface to wirelessly transmit the imaging area information or the imaging target information to the imaging terminal; and a prediction unit configured to predict an imaging timing at which a state of an image of the imaging area or the imaging target becomes a predetermined state based on imaging data corresponding to an image displayed on the display interface, wherein the communication control unit causes the wireless communication interface to wirelessly transmit imaging execution instruction information for issuing an instruction to execute imaging to the imaging terminal at a point in time which is at least a time necessary to wirelessly communicate with the imaging terminal earlier than the imaging timing.

6. The imaging control terminal according to claim 5, wherein the communication control unit causes the wireless communication interface to wirelessly transmit focus adjustment instruction information for issuing a focus adjustment instruction before causing the wireless communication interface to wirelessly transmit the imaging execution instruction information.

7. The imaging control terminal according to claim 5, wherein the imaging timing is a timing at which the imaging target moves to a predetermined position of the imaging area.

8. The imaging control terminal according to claim 5, wherein the prediction unit predicts a time from a start time point of a process related to prediction to the imaging timing at which the state of the image of the imaging area or the imaging target becomes the predetermined state based on imaging data corresponding to an image displayed on the display interface, and predicts a transmission timing of the imaging execution instruction information based on the prediction time and a communication delay time according to wireless communication, and the communication control unit causes the wireless communication interface to wirelessly transmit the imaging execution instruction information to the imaging terminal at the transmission timing.

9. A portable control terminal for controlling a separate digital camera having a camera imaging unit, the portable control terminal comprising:

a wireless communication interface configured to wirelessly communicate with the separate digital camera;

a portable imaging unit configured to generate imaging data;

a display interface configured to display an image corresponding to the imaging data generated by the portable imaging unit;

an operation interface configured to receive an operation of an operator designating an imaging area or an imaging target to be captured by the camera imaging unit of the separate digital camera before an image captured by the camera imaging unit of the separate digital camera is wirelessly received by the portable control terminal in a state in that the portable control terminal and the separate digital camera are wirelessly connected;

an information generation unit configured to generate imaging area information representing the imaging area or imaging target information representing the imaging target; and a communication control unit configured to cause the wireless communication interface to wirelessly transmit the imaging area information or the imaging target information to the separate digital camera.

* * * * *